US007002820B2

(12) United States Patent
Chen et al.

(10) Patent No.: US 7,002,820 B2
(45) Date of Patent: Feb. 21, 2006

(54) SEMICONDUCTOR STORAGE DEVICE

(75) Inventors: Zhizhang Chen, Corvallis, OR (US); Mark David Johnson, Corvallis, OR (US); Lung Tran, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/871,761

(22) Filed: Jun. 17, 2004

(65) Prior Publication Data

US 2005/0281075 A1 Dec. 22, 2005

(51) Int. Cl.
*G11C 19/08* (2006.01)

(52) U.S. Cl. .......................... 365/34; 365/33; 365/163; 977/DIG. 1

(58) Field of Classification Search .................. 365/34, 365/33, 189.01, 158, 163; 977/DIG. 1
See application file for complete search history.

(56) References Cited

U.S. PATENT DOCUMENTS 5,296,716 A 3/1994 Ovshinsky et al.
5,307,311 A 4/1994 Sliwa, Jr.
5,610,898 A * 3/1997 Takimoto et al. ........... 369/126
5,801,472 A 9/1998 Wada et al.
5,886,922 A 3/1999 Saito et al.
5,927,995 A 7/1999 Chen et al.
5,952,671 A 9/1999 Reinberg et al.
5,970,336 A 10/1999 Wolstenholme et al.
6,046,465 A 4/2000 Wang et al.
6,049,650 A 4/2000 Jerman et al.
6,064,587 A * 5/2000 Jo ............................. 365/145
6,113,685 A 9/2000 Wang et al.
6,136,208 A 10/2000 Chou et al.
6,294,450 B1 9/2001 Chen et al.
6,337,266 B1 1/2002 Zahorik
6,392,934 B1 * 5/2002 Saluel et al. ........... 365/189.01
6,407,443 B1 6/2002 Chen et al.
6,420,692 B1 7/2002 Burroughs et al.
6,432,740 B1 8/2002 Chen
6,518,156 B1 2/2003 Chen et al.
6,541,309 B1 4/2003 Chen
6,542,400 B1 4/2003 Chen et al.
6,579,742 B1 6/2003 Chen
6,851,301 B1 * 2/2005 Kim et al. .................... 73/105
6,891,747 B1 * 5/2005 Bez et al. ................... 365/158
2004/0065818 A1 * 4/2004 Hong et al. ................. 250/234
2004/0182707 A1 * 9/2004 Jardemark et al. .......... 204/451
2004/0201378 A1 * 10/2004 Sugano ....................... 324/234
2004/0238809 A1 * 12/2004 Adamec et al. ............... 257/10
2005/0044333 A1 * 2/2005 Browning ................... 711/164
2005/0074576 A1 * 4/2005 Chaiken et al. ............ 428/64.1

* cited by examiner

*Primary Examiner*—Richard Elms
*Assistant Examiner*—N. Nguyen

(57) ABSTRACT

A semiconductor storage device including a tip electrode, a media electrode and a storage media. The storage media has a storage area configurable to be in one of a plurality of structural states to represent information stored at the storage area, by passing a current through the storage area between the tip electrode and media electrode.

34 Claims, 6 Drawing Sheets

SEMICONDUCTOR STORAGE DEVICE

BACKGROUND

Researchers have been working to increase storage density and reduce storage cost of information storage devices such as magnetic hard -drives, optical drives, and semiconductor random access memory. However, increasing the storage density is becoming increasingly difficult. Conventional technologies appear to be approaching fundamental limits on storage density. For instance, information storage based on conventional magnetic recording is rapidly approaching fundamental physical limits such as the superparamagnetic limit, below which a magnetic bit is not stable at room temperature.

Information storage devices that do not face these fundamental limits are being researched and developed. One such device, an atomic resolution storage device, includes multiple electron emitters having electron emission surfaces that are proximate a storage medium. During a write operation, an electron emitter changes the state of a submicron-sized storage area on the storage medium by bombarding the storage area with a relatively high intensity electron beam having an appropriate pulse shape and amplitude. The storage medium is either in a polycrystalline state or an amorphous state. By changing the state of the storage area, a bit is written to the storage area.

Another such device is a thermal random access memory (RAM). Thermal RAMs are cross point memories that use current to change the state of a storage area (cell) located at the cross point of two conductors in an array. A typical thermal RAM cell includes a storage area that is either in a polycrystalline state or an amorphous state. By changing the state of the storage area, a bit is written to the storage area. A programming current to drive the state (i.e., phase) change is in the range of a few milli-amperes. A large area transistor is used to support the programming current.

There is a need for a non-volatile semiconductor storage device, having a lower programming current relative to Thermal RAM, with increased storage capacity.

SUMMARY

Embodiments of the present invention provide a semiconductor storage device. In one embodiment, the semiconductor storage device includes a tip electrode, a media electrode, and a storage media. The storage media has a storage area configurable to be in one of a plurality of structural states to represent information stored at the storage area, by passing a current through the storage area between the tip electrode and media electrode.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DETAILED DESCRIPTION

Figure 1:
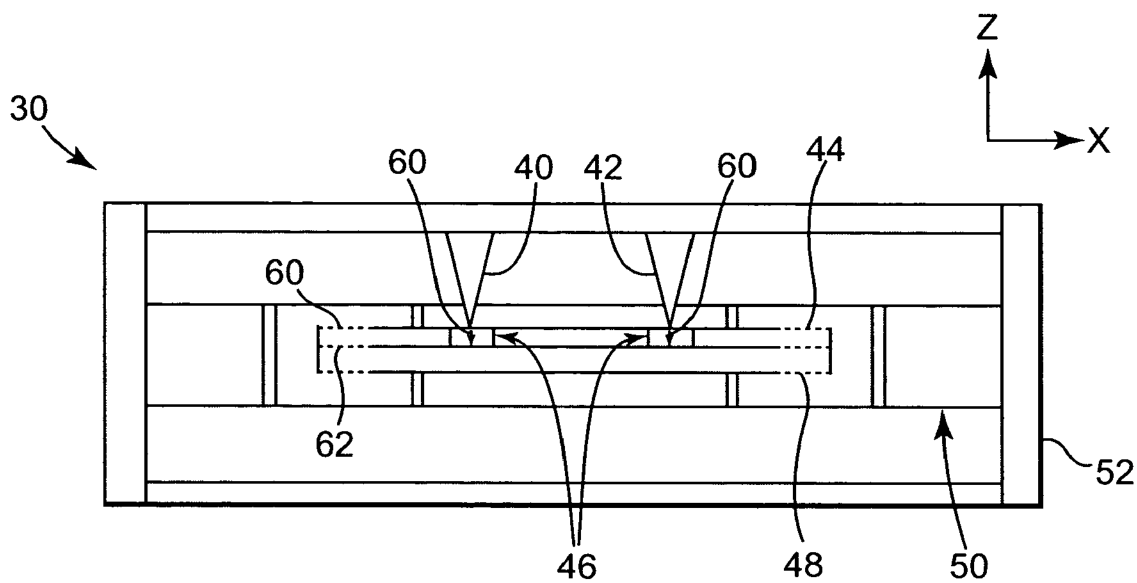
FIG. 1 is a side view illustrating an embodiment of a semiconductor storage device, according to the present invention.

FIG. 1 is a side view illustrating one embodiment of a semiconductor storage device 30. Storage device 30 includes a plurality of tip electrodes (tip electrode 40 and tip electrode 42 are shown), a storage media 44 having a plurality of storage areas 46, media electrode 48, a micromover 50, and a housing 52. Tip electrodes 40 and 42 are proximate storage media 44. Storage media 44 is coupled to micromover 50. Housing 52 encloses tip electrodes 40 and 42, storage media 44, and micromover 50. Semiconductor storage device 30 is made using semiconductor microfabrication techniques.

An actual storage device 30 includes a plurality of tip electrodes, one or more storage medias, one or more micromovers, and associated circuitry for reading data from and writing data to the storage medias. Only two tip electrodes 40 and 42, one storage media 44, and one micromover 50 are shown to simplify the illustration.

Storage media 44 is positioned between tip electrodes 40 and 42, and media electrode 48. Storage areas 46 are configurable to be in one of a plurality of structural states by passing a current 60 through the storage area 46. The plurality of structural states represent information stored at the storage area. In one embodiment, a voltage is applied between tip electrode 40 and media electrode 48 to induce the current 60 through storage area 40 for reading and writing information at the storage area.

Tip electrodes 40 and 42 are in contact with storage media 44 during a read or write operation. The tip contact area between tip electrodes 40 and 42 and storage media 44 is small. In one embodiment, the tip contact area has a diameter range between 5 nanometers and 50 nanometers. The small tip contact area requires less power to read or write information at storage area 46 (e.g., a read or write current of 100 pico amps or less at 3 volts or less). Further, the small tip contact area enables a higher data density stored at storage media 44. The actual read or write current required is dependent on the specific material used for storage media 44.

Tip electrodes 40 and 42 are made of silicon. In one embodiment, tip electrodes 40 and 42 are "heavily doped" to provide a lower contact resistance resulting in a lower read or write current relative to other known devices such as a thermal RAM. The lower read or write current reduces storage device power requirements with less volume change and increases switching speed and improves device reliability. In another embodiment, tip electrodes 40 and 42 are heavily doped diamond tips or metal coated. Tip electrodes 40 and 42 are described in further detail later in this application.

Storage media 44 is a non-volatile storage media having a first major surface 60 and a second major surface 62. First major surface 60 is an exposed substantially planar surface. Second major surface 62 contacts media electrode 48. Media electrode 48 is comprised of a metal (e.g., copper, aluminum or molyden) or a heavily doped semiconductor. Storage media 44 includes storage areas 46 that are configurable and have a plurality of states. In one embodiment, the storage areas 46 have a first state and a second state for storing information. The first state and the second state are defined as logic "0" and logic "1", respectively, or vice versa.

Media 44 is made of a phase change material. In one embodiment, the phase change material is a chalocogenide based phase change material. The phase change material comprises alloys Te, Se, Sb, Ni, Ge, In and Ag. In one embodiment, the media phase change material is Ge(2), Sb(2), Te(5), termed GST. During a write operation, a voltage applied between tip electrodes 40 and 42 and media electrode 48 induces a current to flow through each storage area 46. The current changes the structural state of the phase change material in each storage area 46 to an amorphous state from a polycrystalline state. In other embodiments, the current changes the state of the phase change material in each storage area 46 to a polycrystalline state from an amorphous state. Each storage area 46 can store one or more bits of information, represented by the amorphous or polycrystalline state.

The sensed resistance of a storage area 46 in its amorphous state is approximately 100 times greater than the sensed resistance of storage area 46 in its polycrystalline state. In one embodiment, a logic "0" is represented by a resistance within the range of approximately 1.0E+12 ohms to 1.0E+13 ohms in the amorphous state and a logic "1" is represented by a resistance within the range of approximately 1.5E+9 ohms to 1.5E+10 ohms in the polycrystalline state. The actual resistance range and read/write voltage range is dependent on the actual media material. In one embodiment, a read voltage is in the range of 0.3 volts to 5.0 volts, and a write voltage is in the range of 2.0 volts to 15.0 volts.

Micromover 50 provides for movement of storage media 44 relative to tip electrodes 40 and 42 to read and write data into storage media 44. In one embodiment, micromover 50 is coupled to storage media 44, and tip electrodes 40 and 42 are held stationary for movement of storage medium 32 relative to probe tips 40 and 42. In another embodiment, micromover 50 is coupled to tip electrodes 40 and 42, and storage medium 44 is held stationary for movement of tip electrodes 40 and 42 relative to storage media 44.

Micromover 50 moves storage media 44 to position tip electrodes 40 and 42 above different storage areas 46. Micromover 50 can take many forms, as long as it has sufficient range and resolution to position probe tips 40 and 42 over storage areas 38. In one embodiment, micromover 50 is fabricated by semiconductor micro-fabrication techniques, and configured to scan storage media 44 in the X and Y directions with respect to housing 52.

Storage device 30 can include an array of tip elecrodes including tip electrodes 40 and 42. In one embodiment, the pitch between tip electrodes in the array of tip electrodes is 50 micrometers in the X and Y directions. Each tip electrodes 40 and 42 can access bits in tens of thousands to hundreds of millions of storage areas 46. For example, tip electrodes 40 and 42 scan storage areas 46, which have a spacing of approximately 1 to 100 nanometers between storage areas 46. Tip electrodes (e.g., tip electrodes 40 and 42) can be addressed simultaneously or in a multiplexed manner. Parallel addressing schemes significantly reduce access times and increase data rates in storage device 30.

In one embodiment, tip electrodes 40 and 42 are pointed tips having relatively sharp points. Tip electrodes 40 and 42 include a small tip contact area within the range of approximately 15 to 50 nanometers in diameter. Other suitable tip electrode configurations and shapes can be used. For example, the tip electrodes can be flat or planar. The small tip contact area provides for increased bit density. In addition, probe tips 40 and 42 conduct currents for reading from and writing to storage areas 46 in storage medium 32.

During a read operation, tip electrode 40 is positioned by micromover 50 such that the point or end of tip electrode 40 is in contact with a selected storage area 46 of storage media 44. In one embodiment, a voltage within the range of approximately 0.3–0.5 V is applied between tip electrode 40 and media electrode 48. A current within the range of approximately 60–80 pA is induced between tip electrode 40 and media electrode 48 through the selected storage area 46. The magnitude of the signal current depends on the structural state (e.g., amorphous or polycrystalline) of the selected storage area 46. A read circuit senses the current through the selected storage area 46 and determines the resistance of the selected storage area 46. The resistance is indicative of the structural state and corresponding logic level stored in the selected storage area 46.

During a write operation, micromover 50 positions tip electrode 40 such that tip electrode 40 is in contact with a selected storage area 46 of storage media 44. A voltage and current greater than the voltage and current required to read from the selected storage area 46 are required to write to the selected storage area 46. In one embodiment, voltage within the range of approximately 2.8–3.2 V having an appropriate pulse shape is applied between tip electrode 40 and media electrode 48. The voltage induces current 60 through the selected storage area 46 in the range of approximately 90–110 pA. The current modifies the structural state of the selected storage area 46 from a polycrystalline state to an amorphous state or from an amorphous state to a polycrystalline state. A write circuit senses the current through the selected storage area 46 until the structural state of the selected storage area 46 changes, resulting in a change in the resistance of the selected storage area 46. The resistance is indicative of the structural state and the logic level stored in the selected storage area 46.

Figure 2:
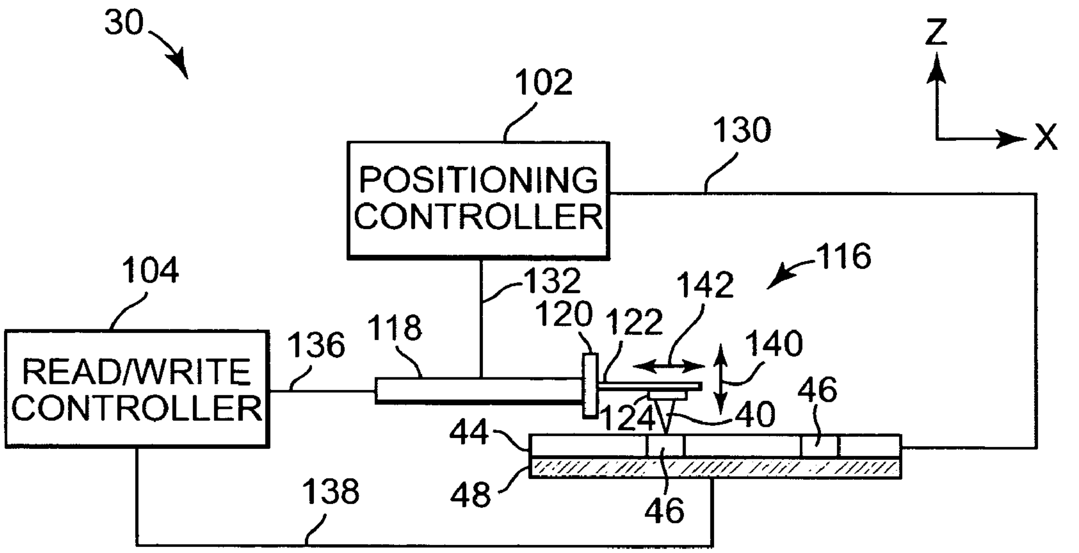
FIG. 2 is a diagram illustrating an exemplary embodiment of a portion of a semiconductor storage device.

FIG. 2 is a diagram illustrating an exemplary embodiment of a portion of storage device 30. Storage device 30 includes a positioning controller 102 and a read/write controller 104. Micromover 50 comprises a scanning assembly indicated at 116. Scanning assembly 116 includes a support arm 118, a z-axis scan actuator 120, a x-y axis scan actuator 122, a scanning head 124, and tip electrode 40. Storage media 44 includes storage areas 46. Media electrode 48 is coupled to storage media 44. Positioning controller 102 is coupled to storage media 44, indicated at 130, and coupled to scanning assembly 116, indicated at 132. Read/write controller 104 is electrically coupled to scanning assembly 116, indicated at 136, and electrically coupled to storage media 44, indicated at 138.

Support arm 118 supports z-axis actuator 118, x-y axis actuator 122, scanning head 124, and tip electrode 40. Support arm 118 moves tip electrode 40 relative to storage media 44. Z-axis scan actuator 120 moves tip electrode 40 along the z-axis, as indicated by arrows 140, substantially orthogonal (i.e., perpendicular) to storage media 44. Z-axis scan actuator 120 removably contacts tip electrode with storage media 44. X-y axis scan actuator 122 moves probe tip electrode 40 horizontally along storage media in the x direction and in the y direction, as indicated by arrows 142. X-y axis scan actuator 122 aligns tip electrode 40 with storage areas 46 in storage media 44. Scanning head 124 supports tip electrode 40. In one embodiment, an array of tip electrodes are supported by scanning head 124.

Scanning assembly 116 is a scanning tunneling microscope (STM) scanning assembly, in which the position of tip electrode 40 is controlled based upon tunneling current information. Alternatively, scanning assembly 116 can be provided as an atomic force microscope (AFM) scanning assembly, in which the position of tip electrode 40 is controlled based upon a force (e.g., an atomic force, an electrostatic force, or a magnetic force) that is generated between tip electrode 40 and the surface of storage media 44. Z-axis scan actuator 120 and x-y axis scan actuator 122 comprise electrostatic actuators, piezo actuators, or other suitable actuators.

Positioning controller 102 controls the vertical and horizontal positions of tip electrode 40 over storage media 44. In operation, positioning controller 102 lowers tip electrode 40 into contact with storage media 44 or raises tip electrode 40 out of contact with storage media 44 using z-axis scan actuator 120. Positioning controller 102 scans the contacting tip electrode 40 horizontally along the surface of storage media 44 by controlling x-y scan actuator 122 or by moving storage media relative to electrode 40 using micromover 50.

Read/write controller 104 controls reading from and writing to storage areas 46. Read/write controller 104 controls the read/write voltage signals, including pulse shape and amplitude, between tip electrode 40 and media electrode 48 to induce currents through storage areas 46 to read from or write to storage areas 46.

Information is written into and read from a selected storage area 46 with probe tip 114. Read/write controller 108 controls the application of a voltage signal, having an appropriate pulse shape and amplitude, between probe tip 114 and electrode 36. After one or more probe tips 114 are positioned over a respective number of selected storage areas 46, read/write controller 104 writes information into the selected storage areas 46. Read/write controller 104 writes information by applying across the selected storage areas 46 a relatively high state-changing voltage in the range of approximately 2.8–3.2 V that is selected to induce currents through the selected storage areas 46. The currents change the structural states of the selected storage areas 46 from crystalline to amorphous or from amorphous to crystalline. In one embodiment, a programming or write current in the range of 95 to 105 pA is sufficient to change the structural state from crystalline to amorphous.

Alternatively, read/write controller 104 reads information stored in the selected storage areas 46. Read/write controller 104 reads information by applying across the selected storage areas 46 a relatively low sensing voltage in the range of approximately 0.3–0.5 V that is selected to induce a current through the selected storage areas 46. Read/write controller 104 senses the current and determines the resistance of the selected storage areas 46 without changing their structural states.

Figure 3:
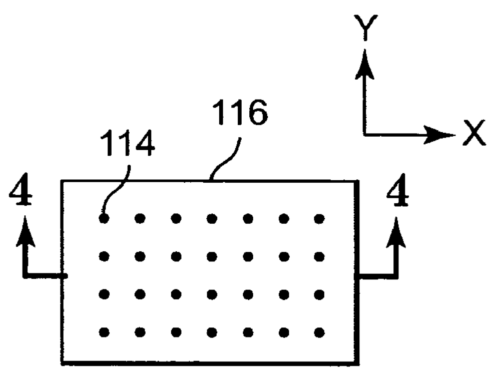
FIG. 3 is a diagram illustrating a top view of an embodiment of an array of probe tips.
Figure 4:
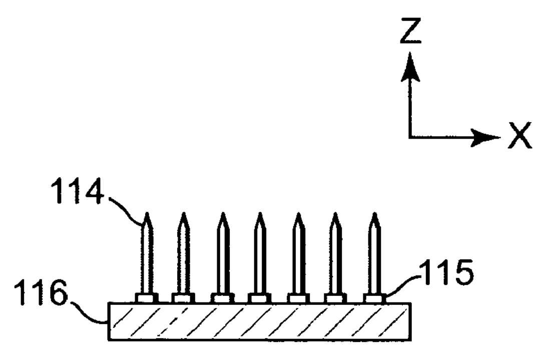
FIG. 4 is a diagram illustrating a side view of an embodiment of an array of probe tips.

FIGS. 3 and 4 are diagrams illustrating views of an exemplary embodiment of scanning assembly 116, respectively. Scanning assembly 116 includes an array of tip electrodes 114 with each tip electrode 114 including a planar actuator 115. Scanning assembly 116 supports the array of tip electrodes 114 with a tip electrode spacing that corresponds to approximately $10$–$10^4$ times the spacing between storage areas 46 of storage device 30.

Tip electrodes are formed from a durable, resilient and electrically conductive semiconductor or a doped semiconductor material (e.g., doped silicon). In another embodiment, the tip electrode is made of a metallic material (e.g., platinum), a non-metallic material (e.g., carbon). In one embodiment, probe tips 114 are carbon nanotubes. As used herein, the term "nanotube" is defined as a hollow article having a narrow dimension (diameter) of about 1–200 nm and a long dimension (length), where the ratio of the long dimension to the narrow dimension (i.e., the aspect ratio) is at least five. In general, the aspect ratio may be between 5 and 2000.

A carbon nanotube is a hollow structure that is formed from carbon atoms. In this embodiment, each tip electrode 114 can be either a multi-walled nanotube or a single-walled nanotube. A multi-walled nanotube includes several nanotubes each having a different diameter. Thus, the smallest diameter tube is encapsulated by a larger diameter tube that, in turn, can be encapsulated by another larger diameter nanotube. In contrast, single-walled nanotube, includes only one nanotube. multi-walled nanotubes typically are produced either as single multi-walled nanotubes or as bundles of multi-walled nanotubes. Single-walled nanotubes, however, typically are produced as ropes of single-walled nanotubes, where each strand of the rope is a single-walled nanotube. The carbon nanotube probe tips 114 are grown by a conventional carbon nanotube fabrication process (e.g., chemical vapor deposition), or by other suitable fabrication processes.

In one embodiment, tips electrodes 40 and 42 are made of silicon doped with phosphorus or arsenic to make the tip electrodes N-type. In other embodiments, tip electrodes 40 and 42 are doped to make them P-type.

Planar actuator 115 is positioned at the base of each tip electrode 114 and is configured to maintain each tip electrode 40 in contact with storage media 44. The tip electrodes 40 may have the same or different lengths. During scanning, each planar actuator 115 adjusts the position of each associated tip electrode 40 to accommodate the respective tip electrode lengths so as to maintain contact between the tip electrodes 40 and storage media 44.

Figure 5:
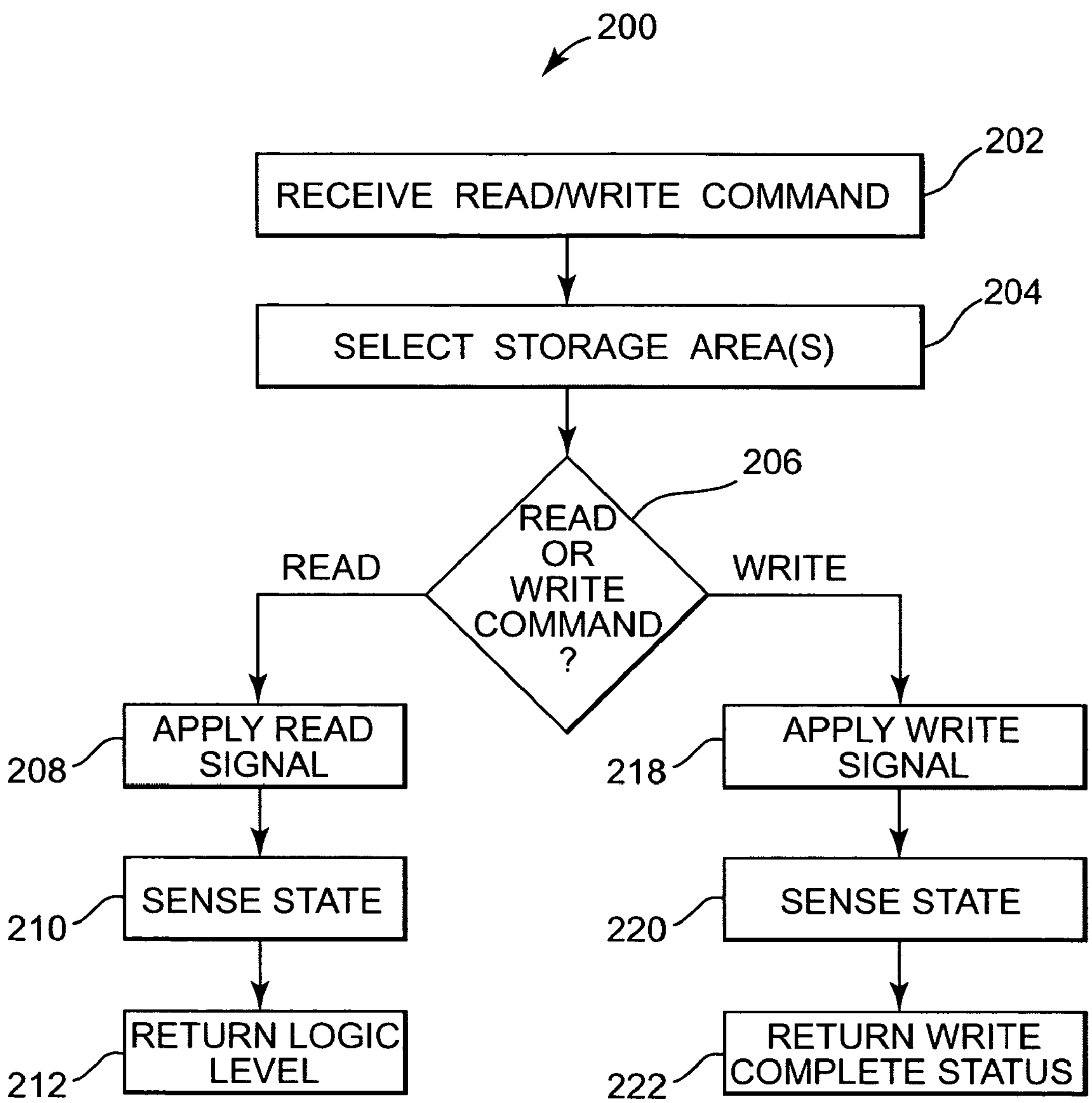
FIG. 5 is a flow diagram illustrating one embodiment of a method for reading from or writing to a semiconductor storage device.

FIG. 5 is a flow diagram illustrating a method 200 for reading from or writing to storage device 30. At 202, read/write controller 104 receives a read or write command from an external device. At 204, positioning controller 102 moves a tip electrode 40 or an array of tip electrodes 40 associated with the selected storage areas 46 where the data is to be written to or read from into position using micromover 44 and/or scanning assembly 116. At 206, if the command is a read command, executing of the command continues at 208. If the command is a write command, executing of the command continues at 218.

For a read command at 208, read/write controller 108 applies a voltage signal within the range of approximately 0.3–0.5 V having an appropriate pulse shape across storage area 46 between tip electrode 40 and media electrode 44. A current in the range of approximately 60–80 pico amperes is induced through the selected storage area 46.

The magnitude of the induced current corresponds to the structural state of the storage area. For example, an amorphous state has a greater resistance than a polycrystalline state. As a result, a lower current is induced for a storage area in an amorphous state.

At 210, read/write controller 104 senses the current through the selected storage area 38. The resistance through the storage area is determined using the sensed current. At 212, read/write controller 104 determines the state of storage area 46 based upon the resistance and provides a logic value to the external device indicating the state of the selected storage area 46.

For a write command at 218, read/write controller 104 provides a voltage within the range of approximately 2.8–3.2 V having an appropriate pulse shape across storage area 46 between tip electrode 40 and media electrode 44. A current within the range of approximately 90–110 pico amperes is induced through the selected storage area 46. At 220, read/write controller 104 controls the voltage and current until the resistance through the storage area 46 changes indicating a structural state change from amorphous to crystalline or crystalline to amorphous. At 222, read/write controller 104 notifies the external device that the write operation is complete.

Figure 6:
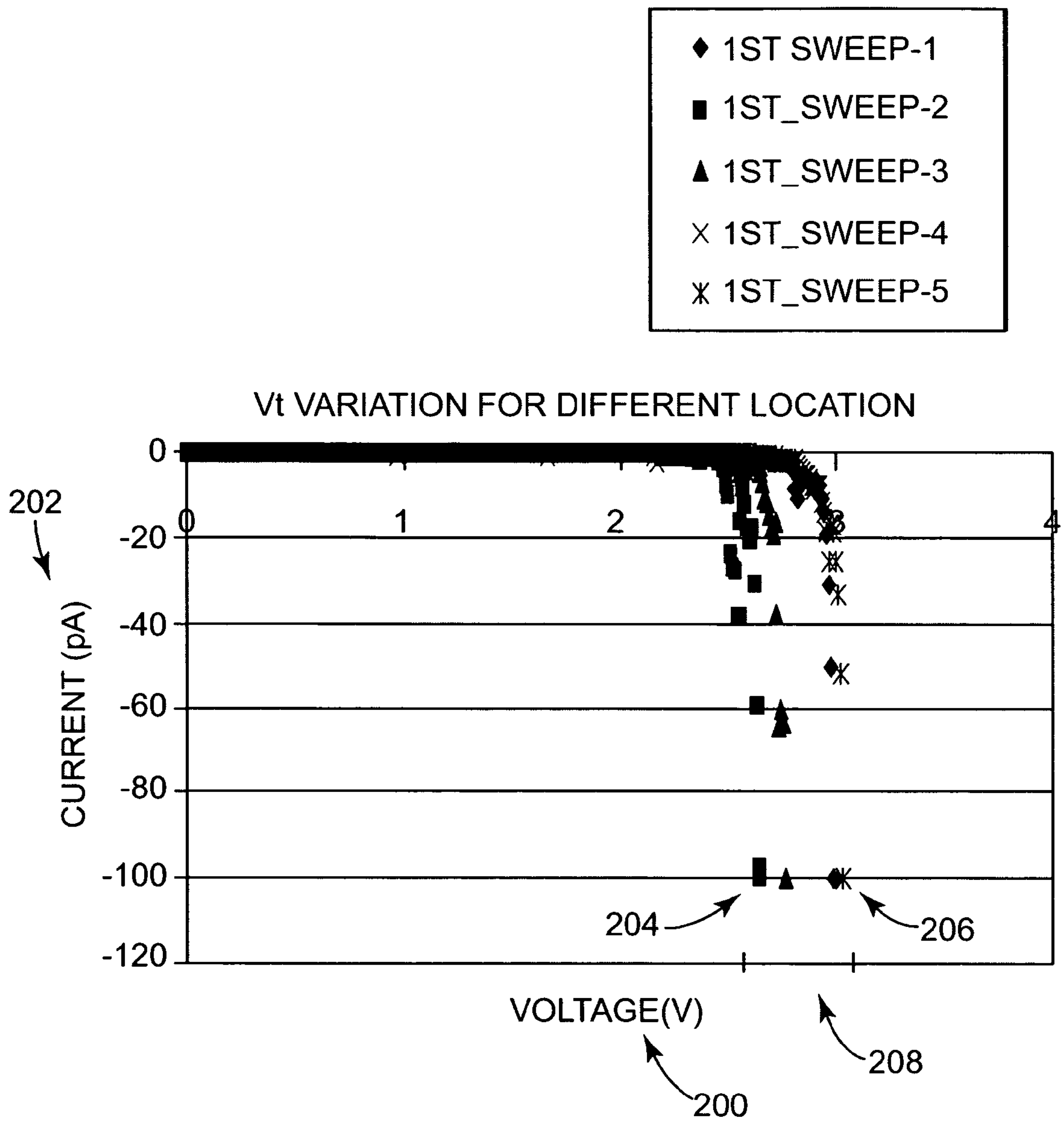
FIG. 6 is a graph illustrating characteristics of one exemplary embodiment of a semiconductor storage device.
Figure 7:
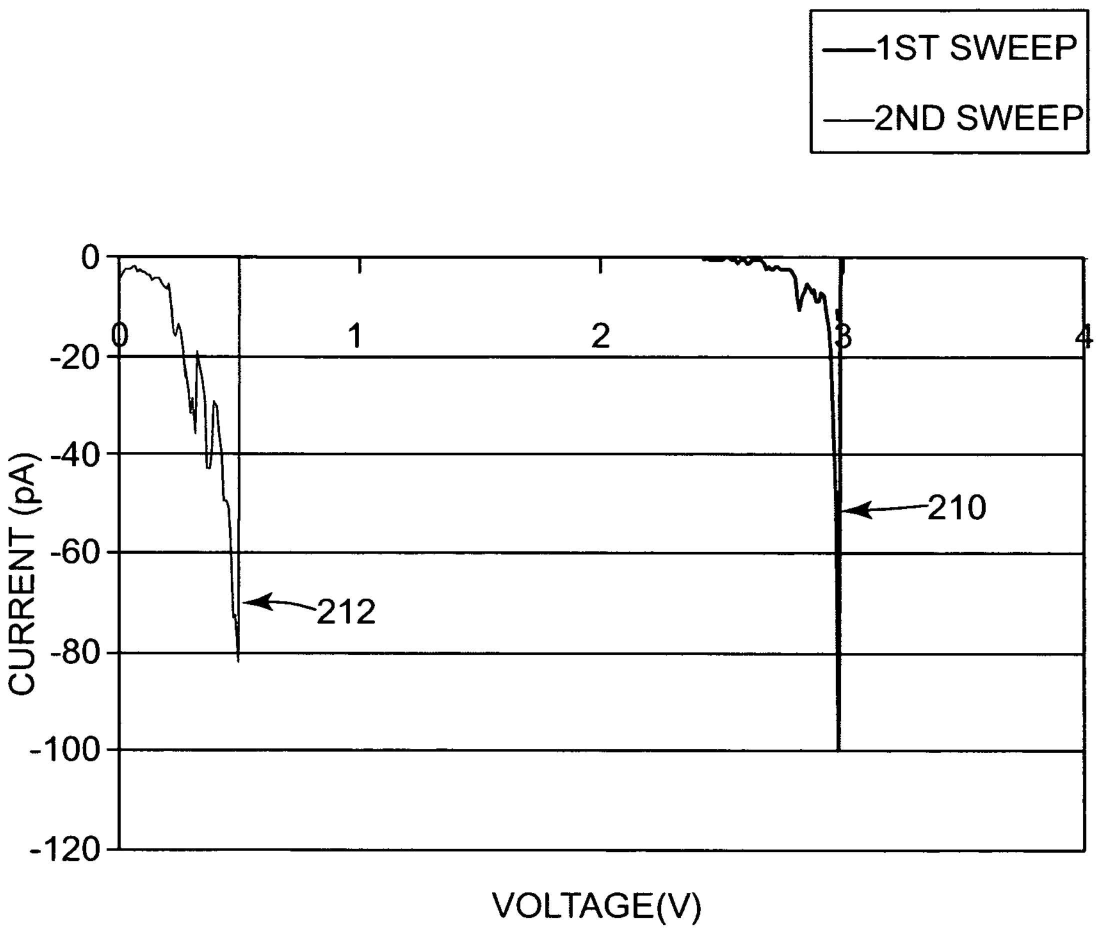
FIG. 7 is a graph illustrating characteristics of one exemplary embodiment of a semiconductor storage device.
Figure 8:
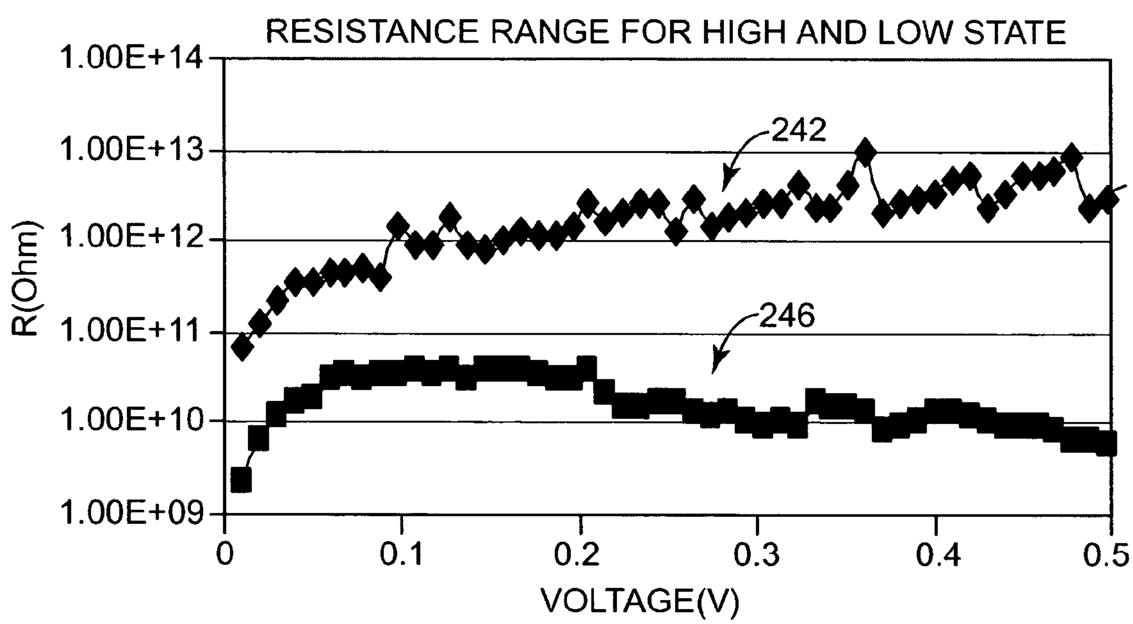
FIG. 8 is a graph illustrating characteristics of one exemplary embodiment of a semiconductor storage device.

FIGS. 6–8 are graphs illustrating characteristics of one exemplary embodiment of semiconductor storage device 30, where the phase change material of storage media 44 is GST. FIG. 6 is a graph illustrating voltage characteristics for writing to different locations on storage media 44 using storage device 30. Five write operations were analyzed. The voltage 200 applied between tip electrode 40 and media electrode 48 is indicated along a first axis. The write current in pico amperes is indicated along a second axis at 202. Writing to a storage area 46 on storage media 44 requires a very small voltage of approximately 3 volts at 100 pico amperes. In this experiment, the variation in voltage applied between the tip electrode 40 and the media electrode 48 is very small, approximately 0.5 volts (between 2.5 volts and 3 volts), in order to obtain a desired write current. For each example write operation, data is written to each storage area 46 at a desired write current of 100 pico amperes.

FIG. 7 is a graph illustrating voltage and current characteristics for one example embodiment of writing and reading at a storage area on semiconductor storage device 30. As indicated by first sweep 210, data is written to a storage area 46 on storage media 44. A voltage of 3 volts is applied between tip electrode 40 and media electrode 48, inducing a write current of 100 pico amperes through storage area 46. Second sweep 212 illustrates the operating characteristics of a read operation. Data is read from storage area 46 by applying a voltage of less than 0.5 volts across tip electrode 40 and media electrode 48, inducing a read current of approximately 80 pico amperes through storage area 46.

FIG. 8 is a graph illustrating the detected resistance range for determining the state of a bit written to a storage area on semiconductor storage device 30. During a read operation, a detected resistance of 1e+10 ohms indicates a logic "1" or high state, indicated at 240. A detected resistance of approximately 1e+12 range results in a logic "0" or low state. It is noted that the resistance range for each high and low state is relatively uniform on application of a read voltage between 0.2 and 0.5 volts across tip electrode 40 and media electrode 48. This graph further illustrates on at least two orders magnitude difference in electrical resistance between a logic and a logic 1 state.

The storage device 30 according to the present invention includes a "heavily doped" tip resulting in lower contact resistance with the phase change media. This results in a lower read or write current relative to conventional thermal RAM devices, reducing the storage device power requirements with less volume change and increased switching speed for improved device reliability. The present invention achieves a programming or write current in the range of only 100 pA.

What is claimed is:

1. A semiconductor storage device comprising:

a tip electrode;

a media electrode;

a storage media having a storage area configurable to be in one of a plurality of structural states to represent information stored at the storage area, by passing a current through the storage area between the tip electrode and media electrode, wherein the tip electrode, the media electrode and the storage media are located in a common semiconductor storage device made using semiconductor microfabrication techniques.

2. The device of claim 1 comprising:

a controller for applying a voltage between the tip electrode is part of a tip structure made by semiconductor microfabrication techniques.

3. The device of claim 1, wherein the tip electrode is part of a tip structure made by semiconductor microfabrication techniques.

4. The device of claim 1, wherein the tip electrode is a doped tip.

5. The device of claim 4, wherein the tip electrode comprises an n-type doped semiconductor.

6. The semiconductor storage device of claim 4, wherein the tip electrode comprises a p-type doped semiconductor.

7. The semiconductor storage device of claim 4, wherein the tip electrode is doped with at least one of phosphorous, arsenic, and boron.

8. The semiconductor storage device of claim 4, wherein the tip electrode comprises a nanotube.

9. The semiconductor storage device of claim 4, wherein the tip electrode comprises silicon.

10. A semiconductor storage device comprising:

a tip electrode;

a media electrode;

a storage media having a storage area comfigurable to be in one of a plurality of structural states to represent information stored at the storage area, by passing a current through the storage area between the tip electrode and media electrode; and wherein the current for writing information at the storage area is as low as 100 pico amperes.

11. A semiconductor storage device comprising:

a tip electrode;

a media electrode;

a storage media having a storage area configurable to be in one of a plurality of structural states to represent information stored at the storage area, by passing a current through the storage area between the tip electrode and media electrode; and wherein the current for reading information at the storage area is approximately 80 pico amperes.

12. A semiconductor storage device comprising:

a silicon tip electrode having a tip contact area structure;

a media electrode;

a storage media in contact with the tip electrode, the storage media having a storage area configurable to be in one of a plurality of structural states to represent information stored at the storage area;

a controller for applying a voltage between the tip electrode and the media electrode to induce a current through the storage area for reading or writing information at the storage area, wherein the tip electrode is movable relative to the storage media along a surface of the storage media; and wherein the silicon tip electrode, the media electrode, the storage media and the controller are provided in a single semiconductor storage device.

13. The semiconductor storage device of claim 12, wherein the tip electrode is configured to move orthogonally relative to a surface of the storage media.

14. The semiconductor storage device of claim 12, wherein the tip is configured to move substantially parallel relative to the surface of the storage media.

15. The semiconductor storage device of claim 12, comprising a micromover for moving the storage media and the tip electrode relative to each other.

16. A storage device comprising:

a tip electrode;

a media electrode;

a storage media made of phase change material positioned between the tip electrode and the media electrode, in contact with the tip electrode and the media electrode, the storage media having a storage area configurable to be in one of a plurality of structural states to represent information stored at the storage area, wherein the plurality of structural states comprises a polycrystalline state and an amorphous state;

a controller for applying a voltage between the tip electrode and the media electrode to induce a current through the storage area for reading or writing information at the storage area; and wherein the tip electrode, the media electrode, the storage media and the controller provide a semiconductor storage device made using semiconductor microfabrication techniques.

17. The semiconductor storage device of claim 16, wherein a resistance of the polycrystalline state is approximately two orders of magnitude less than a resistance of the amorphous state.

18. The semiconductor storage device of claim 16, wherein the tip electrode includes a tip contact area with the storage media, the tip contact area having a diameter as small as 5 nanometers.

19. The semiconductor storage device of claim 18, wherein the tip contact area is approximately 25 nanometers.

20. The semiconductor storage device of claim 16, wherein the phase change material comprises a chalcogenide based phase change material.

21. The semiconductor storage device of claim 16, wherein the phase change material comprises an alloy including one of Te, Se, Sb, Ni, Ge, In and Ag or a combination of these.

22. The semiconductor storage device of claim 16, further comprising:

a housing at least partially enclosing the tip electrode, the storage media and the controller.

23. The semiconductor memory of claim 16, further comprising:

a tip structure defined by a support arm coupled to the tip electrode.

24. The semiconductor memory of claim 16, further comprising:

a first actuator for removably contacting the tip electrode to the storage media.

25. The semiconductor memory of claim 24, further comprising:

a second actuator for moving the tip electrode along a surface of the storage media.

26. The semiconductor memory of claim 16, wherein the media electrode comprises a metal.

27. A semiconductor storage device comprising:

an array of tip electrodes made by semiconductor microfabrication techniques;

one or more media electrodes;

a storage media in contact with the array of tip electrodes, the storage medium having a plurality of storage areas being in one of a plurality of structural states to represent information stored at the storage areas; and a read/write controller for controlling the voltages across the plurality of tip electrodes and the media electrodes to induce currents through the plurality of storage areas for reading or writing information at the plurality of storage areas.

28. A method of reading the state of a storage area in a semiconductor storage device comprising:

providing a tip electrode and a storage area in the semiconductor storage device made using semiconductor microfabrication techniques;

contacting a tip electrode to a storage area;

applying a voltage across the storage area between the tip electrode and a media electrode to induce a current through the storage area;

sensing the current through the storage area; and determining a sensed value representative of the structural state of the storage area using the sensed current.

29. The method of claim 28, wherein the current is a read current, and the voltage is less than 0.5 volts.

30. The method of claim 28, further comprising:

controlling the current through the storage area to change the structural state of the storage area between an amorphous state and a polycrystalline state.

31. A method of reading the state of a storage area in a semiconductor storage device comprising:

contacting a tip electrode to a storage area;

applying a voltage across the storage area between the tip electrode and a media electrode to induce a current through the storage area;

sensing the current through the storage area;

determining a sensed value representative of the structural state of the storage area using the sensed current;

controlling the current through the storage area to change the structural state of the storage area between an amorphous state and a polycrystalline state; and wherein controlling the current comprises adjusting the current to approximately 100 pico amperes by applying a voltage between the tip electrode and the media electrode.

32. A semiconductor storage device comprising:

an array of tip electrodes made by semiconductor microfabrication techniques;

one or more media electrodes;

a storage media in contact with the array of tip electrodes, the storage medium having a plurality of storage areas being in one of a plurality of structural states to represent information stored at the storage areas;

a semiconductor housing containing the array of tip electrodes, the one or more media electrodes, and the storage media; and a read/write controller for controlling the voltages across the plurality of tip electrodes and the media electrodes to induce currents through the plurality of storage areas for reading or writing information at the plurality of storage areas.

33. The device of claim 32, comprising wherein the read/write controller is contained within the semiconductor housing.

34. The device of claim 32, wherein the array of tip electrodes are attached to a common planar surface.

* * * * *